(12) United States Patent
Zernov

(10) Patent No.: US 6,836,995 B1
(45) Date of Patent: Jan. 4, 2005

(54) VIBRATING FISHING ROD

(76) Inventor: Jeffrey P Zernov, 22620 O'Brien Rd., Brainerd, MN (US) 56401

( * ) Notice: Subject to any disclaimer, the term of this patent is extended or adjusted under 35 U.S.C. 154(b) by 0 days.

(21) Appl. No.: 10/442,341

(22) Filed: May 21, 2003

(51) Int. Cl.$^7$ ............................................... A01K 91/06
(52) U.S. Cl. ......................................... 43/19.2; 43/26.1
(58) Field of Search ............................. 43/19.2, 18.1 R, 43/26.1

(56) References Cited

U.S. PATENT DOCUMENTS

| | | | | |
|---|---|---|---|---|
| 1,465,707 A | * | 8/1923 | Bartholomew | 43/19.2 |
| 2,746,198 A | * | 5/1956 | Smith | 43/19.2 |
| 2,758,407 A | * | 8/1956 | Speidell | 43/19.2 |
| 2,783,576 A | * | 3/1957 | Filut | 43/19.2 |
| 2,908,103 A | * | 10/1959 | Mertz | 43/19.2 |
| 3,600,837 A | * | 8/1971 | Bristol | 43/19.2 |
| 3,789,534 A | * | 2/1974 | Yankaitis | 43/19.2 |
| 3,835,570 A | * | 9/1974 | Philip | 43/19.2 |
| 3,955,303 A | * | 5/1976 | Outlaw et al. | 43/19.2 |
| 3,981,095 A | * | 9/1976 | Shepherd | 43/19.2 |
| 4,020,582 A | * | 5/1977 | Thelen | 43/19.2 |
| 4,084,342 A | * | 4/1978 | Philip | 43/19.2 |
| 4,100,695 A | * | 7/1978 | Blanchard | 43/19.2 |
| 4,120,112 A | * | 10/1978 | McBain | 43/19.2 |
| 4,251,939 A | * | 2/1981 | Tiede | 43/19.2 |
| 4,349,978 A | * | 9/1982 | Philip | 43/19.2 |
| 4,420,900 A | * | 12/1983 | Nestor | 43/19.2 |
| 4,528,767 A | * | 7/1985 | Smith, Jr. | 43/19.2 |
| 4,603,499 A | * | 8/1986 | Simborski | 43/19.2 |
| 4,680,885 A | * | 7/1987 | Lindell et al. | 43/19.2 |
| 4,700,501 A | * | 10/1987 | Bryan | 43/19.2 |
| 4,821,448 A | * | 4/1989 | Lindaberry | 43/19.2 |
| 5,004,181 A | * | 4/1991 | Fowles | 43/26.1 |
| 5,036,616 A | * | 8/1991 | Wilsey | 43/19.2 |
| 5,437,121 A | * | 8/1995 | Chacon et al. | 43/19.2 |
| 5,473,835 A | * | 12/1995 | Emett | 43/19.2 |
| 5,535,538 A | * | 7/1996 | Heuke | 43/19.2 |
| 5,540,010 A | * | 7/1996 | Aragona | 43/19.2 |
| 5,570,534 A | * | 11/1996 | Ford | 43/19.2 |
| 6,009,656 A | * | 1/2000 | Knepp | 43/19.2 |
| 6,220,538 B1 | * | 4/2001 | Durso | 43/26.1 |
| 6,318,653 B1 | * | 11/2001 | Dobbins | 43/26.1 |
| 6,363,650 B1 | * | 4/2002 | Beeler | 43/19.2 |
| 6,401,380 B1 | * | 6/2002 | McGonigal, Jr. | 43/19.2 |
| 2004/0025402 A1 | * | 2/2004 | Seidler | 43/19.2 |

FOREIGN PATENT DOCUMENTS

| | | | | |
|---|---|---|---|---|
| JP | 5-227864 B1 | * | 9/1993 | 43/19.2 |
| RU | 181904 B1 | * | 10/1966 | 43/19.2 |
| RU | 665878 B1 | * | 6/1979 | 43/19.2 |
| RU | 1303107 B1 | * | 4/1987 | 43/19.2 |
| RU | 1598942 B1 | * | 10/1990 | 43/19.2 |
| RU | 1651810 B1 | * | 5/1991 | 43/19.2 |
| RU | 1717044 B1 | * | 3/1992 | 43/19.2 |
| RU | 1755755 B1 | * | 8/1992 | 43/19.2 |
| RU | 1822698 B1 | * | 6/1993 | 43/26.1 |

* cited by examiner

*Primary Examiner*—Darren W. Ark
(74) *Attorney, Agent, or Firm*—D L Tschida

(57) ABSTRACT

A fishing rod having a motorized vibrator secured to a floating rod blank. The rod blank is substantially displaced from the bore of a handle. A ferrule switch mounted to a suspended portion of the handle contains a battery power source that is manipulated as a switch contact. A vibrator includes a motor and eccentric weight and is supported to the rod blank forward of the handle and responsively vibrates the rod blank for controlled periods and/or frequencies and a supported fishing line and lure.

20 Claims, 6 Drawing Sheets

VIBRATING FISHING ROD

BACKGROUND OF THE INVENTION

The present invention relates to fishing rods and, in particular, to a rod blank suspended within a rod handle and having a ferrule switch mounted to the rod handle and a vibrator mounted to the rod blank to induce vibrating movement to a suspend fishing line and lure.

A common fishing technique is to jig a rod up and down from several inches to several feet in a preferred sequence to cause a suspended lure to correspondingly rise and fall with a fluttering action that initiates an injured prey species. Such movements attract fish and can induce active or feeding fish to strike. A variety of devices have therefore been developed to support and jig or manipulate a fishing rod up and down, for example U.S. Pat. Nos. 6,401,380; 4,251,939; 4,100,695; 4,020,582.

A variety of other devices have been developed to jig or manipulate a fishing line up and down, for example U.S. Pat. Nos. 4,821,948; 4,528,767; 4,420,900; 4,349,978; 4,120,112; 3,981,095; 3,789,534; 3,600,837; 2,908,103; 2,783,576; and 2,746,198.

U.S. Pat. No. 4,700,501 discloses a battery-powered device that simultaneously vibrates the rod blank and a suspended fishing line.

Although active jigging actions can be productive with active, feeding fish, a continuing problem is enticing a neutral or generally inactive fish into striking a presented bait. A neutral fish may merely swim in place and inspect the lure or bait. On such occasions, a fisherman can sometimes manually manipulate the lure with subtle vibrations, and/or with subtle changes to the lure's elevation, to induce a strike.

The present invention was developed to provide a modular assembly that can be adapted to any fishing rod, although finds particular application with relatively short ice fishing rods. Preferably the rod is constructed with a floating rod blank; that is, the rod blank is substantially free to move and vibrate within a support handle. A ferrule switch mounts to a suspended portion of the handle and within which a battery power source is manipulated as a switch contact. A motor and a driven eccentric weight are supported to the rod blank forward of the handle to induce vibration in the rod blank, line and suspended lure.

SUMMARY OF THE INVENTION

It is a primary object of the invention to provide a modularly configured, vibrating fishing rod.

It is further object of the invention to provide a fishing rod wherein the rod blank mounts in substantial floating suspension to the handle.

It is further object of the invention to provide a ferrule switch assembly that attaches to a rod handle and manipulates a battery power source as a switch contact.

It is a further object of the invention to provide a vibrator having a motor and eccentric weight in a housing having a clip fastener that attaches to the rod blank.

It is a further object of the invention to provide a switch having timing control over the vibrator whereby a fisherman can select desired periods of operation.

The foregoing objects, advantages and distinctions of the invention are obtained in a presently preferred ice fishing rod. The rod blank is mounted in substantial, concentric, floating suspension to a bore of the handle and is minimally secured to the handle at a proximal end. A two-piece, ferrule switch housing is fitted to a fore-end of the rod handle and a battery power source is spring biased as a switch contact. A motor and driven eccentric weight are supported in a housing having a clip fastener that attaches to the rod blank distal of the handle. The separation between the motor and anchor point of the rod blank to the handle are selected to enhance rod blank vibrations. Selective manual manipulation of the fishing rod and operation of the switch enhance lure presentation for active and neutral fish.

Still other objects, advantages, distinctions and constructions and combinations of individual features of the invention will become more apparent from the following description with respect to the appended drawings. Similar components and assemblies are referred to in the various drawings with similar alphanumeric reference characters. The description therefore should not be literally construed in limitation of the invention. Rather, the invention should be interpreted within the broad scope of the further, appended claims.

Figure 1:
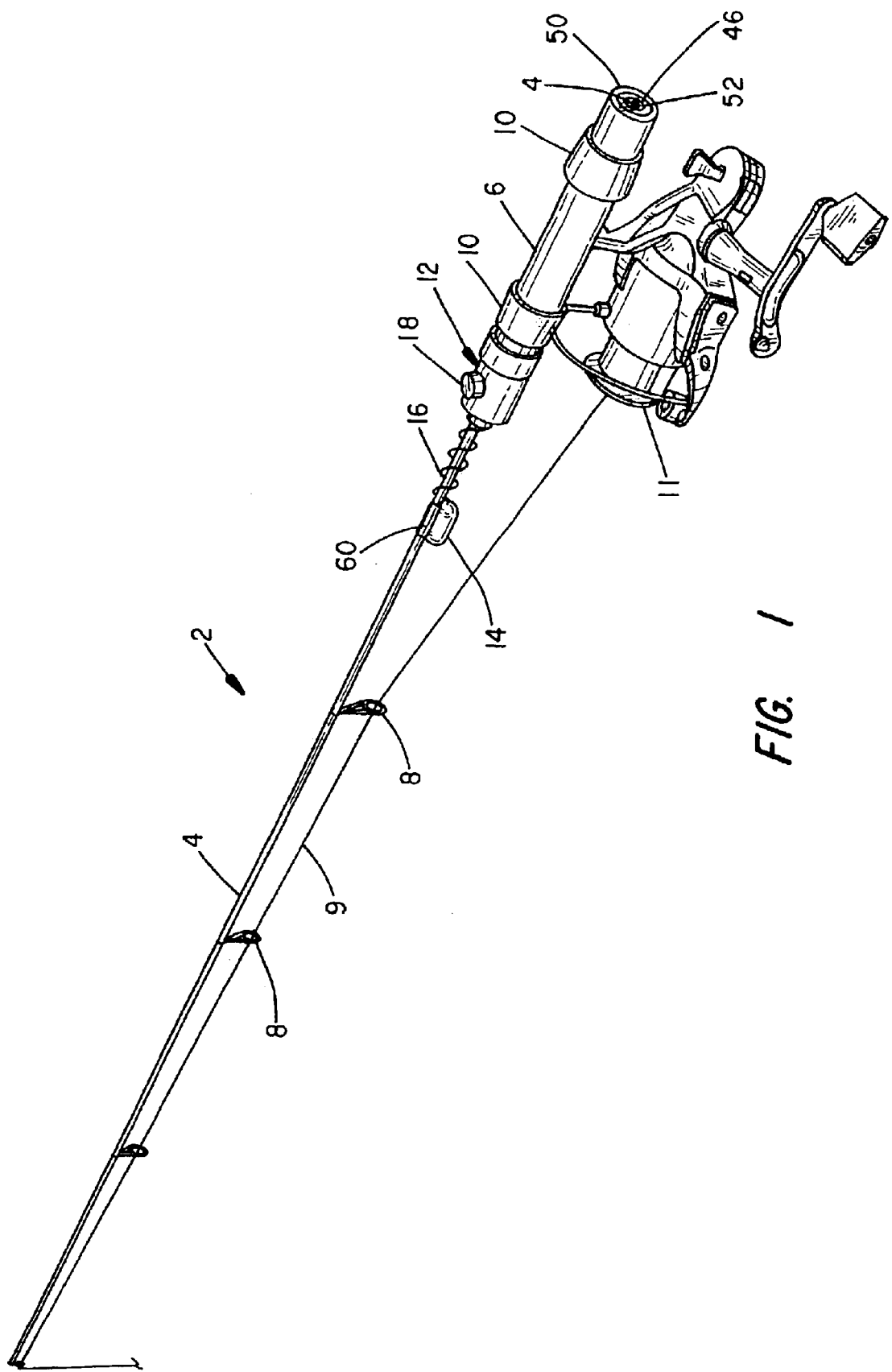
FIG. 1 shows a perspective view of a fishing rod wherein the handle section of the fishing rod is outfitted with a ferrule switch and a motorized vibrator.

Like components at the drawings are referenced with like alphanumeric reference characters.

DESCRIPTION OF THE PREFERRED EMBODIMENT

Figure 5:
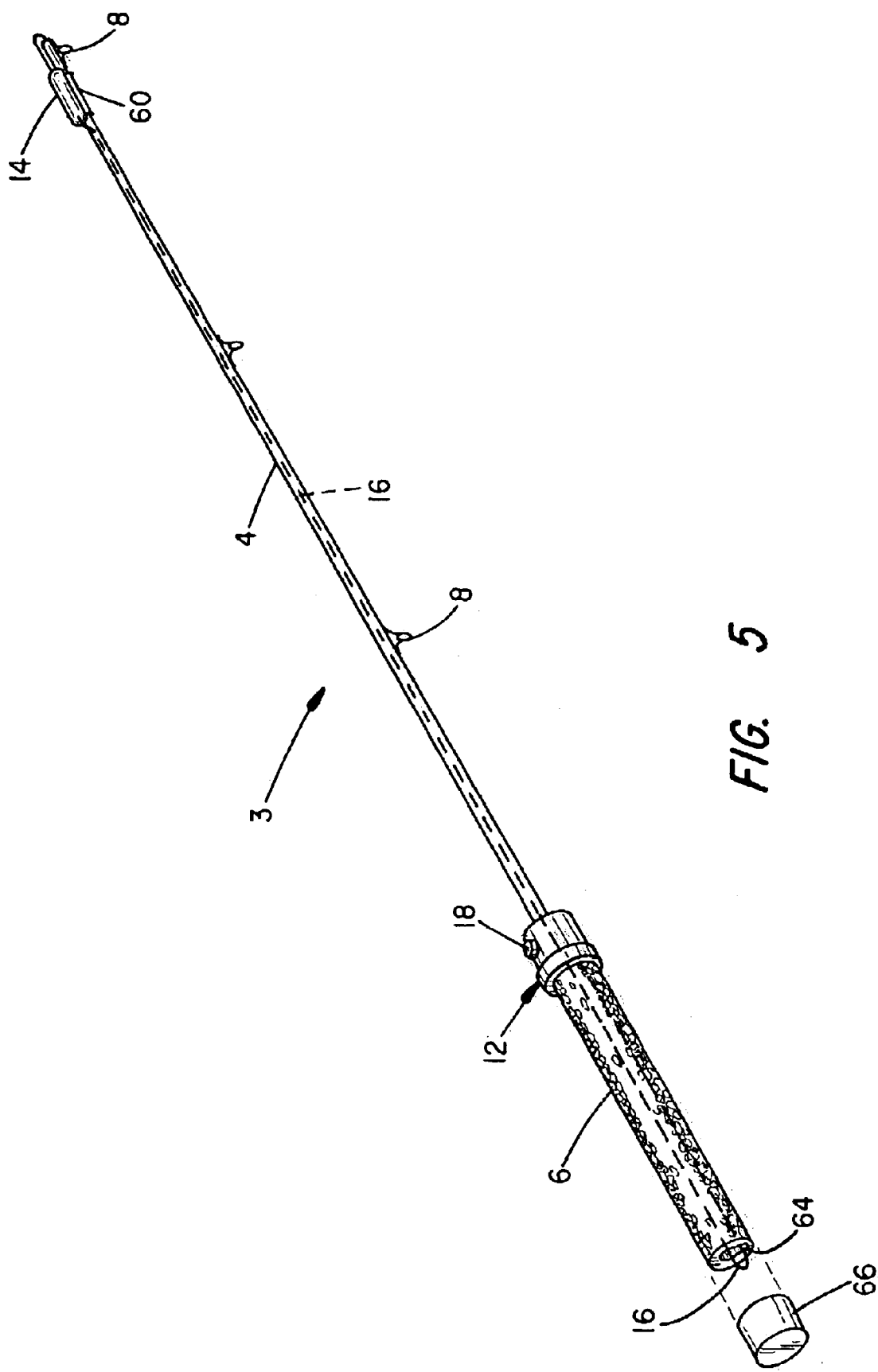
FIG. 5 is a perspective drawing shown in exploded assembly to an open water fishing rod with a motorized vibrator attached to the tip of the rod blank.

Referring to FIG. 1, a perspective drawing is shown to a typical ice fishing rod 2. FIG. 5 shows an open water fishing rod. The principal difference between ice rods and open water rods is rod length. Ice fishing rods typically extend 24-inches to 48-inches, whereas open freshwater water rods are much longer and can extend 5-feet to 10-feet. Shore fishing rods (e.g. telescoping poles might extend 15-feet to 20-feet. Saltwater rod length varies depending upon the species and fishing technique (e.g. shore or boat).

The rod 2, regardless of length, consists of a tapered rod blank 4 that is mounted to a handle 6. The rod blank 4 can be constructed of a variety of conventional fiberglass, graphite and composite materials. A number of line guides 8 are secured to the blank 4 with windings of wrapped thread that are sealed with an epoxy. A pair of annular rings secure a fishing reel 11 containing a length of fishing line 9 to the handle 6. The reel 11 can vary in construction (e.g. open or closed face spin casting, bait casting etc.) depending upon the type of handle 6 and eyes 8 provided at the rod 4. The reel 11 can also be secured directly to the handle 6 with tape (e.g. as with the fishing rod of FIG. 5) or at a pre-formed reel seat having at least one sliding collar piece to restrain the reel 11 to the handle 6.

A ferrule switch assembly 12 is secured to the fore-end of the handle 6 and a motorized vibrator 14 is mounted to the rod blank 4 approximately 6 to 12-inches from the switch 12. One or more wrapped conductors 16 extend between the switch 12 and vibrator 14 and/or the conductor 16 can provide a sheath that includes multiple conductors. The length of the conductors 16 can be varied as desired to obtain a desired separation (i.e. lever arm) between the vibrator 14 and an anchoring point of the rod blank 4 to the handle 6; the greater the separation between the vibrator 14 and anchor point, the larger the period of oscillating movement at the lure. The conductors 16 can be wrapped about the blank 4 or might mount within the blank 4. Conductive stripes might also be adhered or plated onto the blank or conductors even be cast into the rod blank 4.

A pushbutton 18 is conveniently located in relation to the handle 4 and is normally mounted forward of the open-face spinning reel 11 to permit the selective actuation of the vibrator 14 in relation to normal fishing actions. For example, the line 9 and a suspended lure of preferred size and color can be vibrated between intermittent jigging actions to cause the lure to vibrate as it falls and flutters. Alternatively, the line 9 and lure might only be vibrated when the lure is held suspended at a constant depth. The jigging action and vibration can thus be selectively tailored by the fisherman to the existing fishing conditions and each fish.

Figure 2:
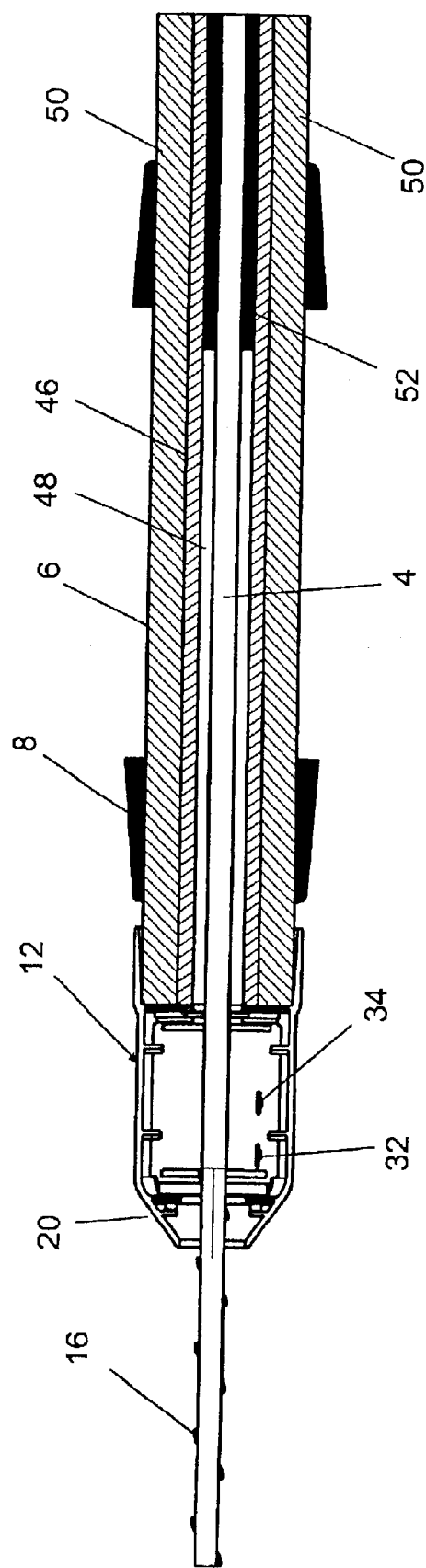
FIG. 2 is a longitudinal cross section drawing through the handle section of the fishing rod of FIG. 1.
Figure 3:
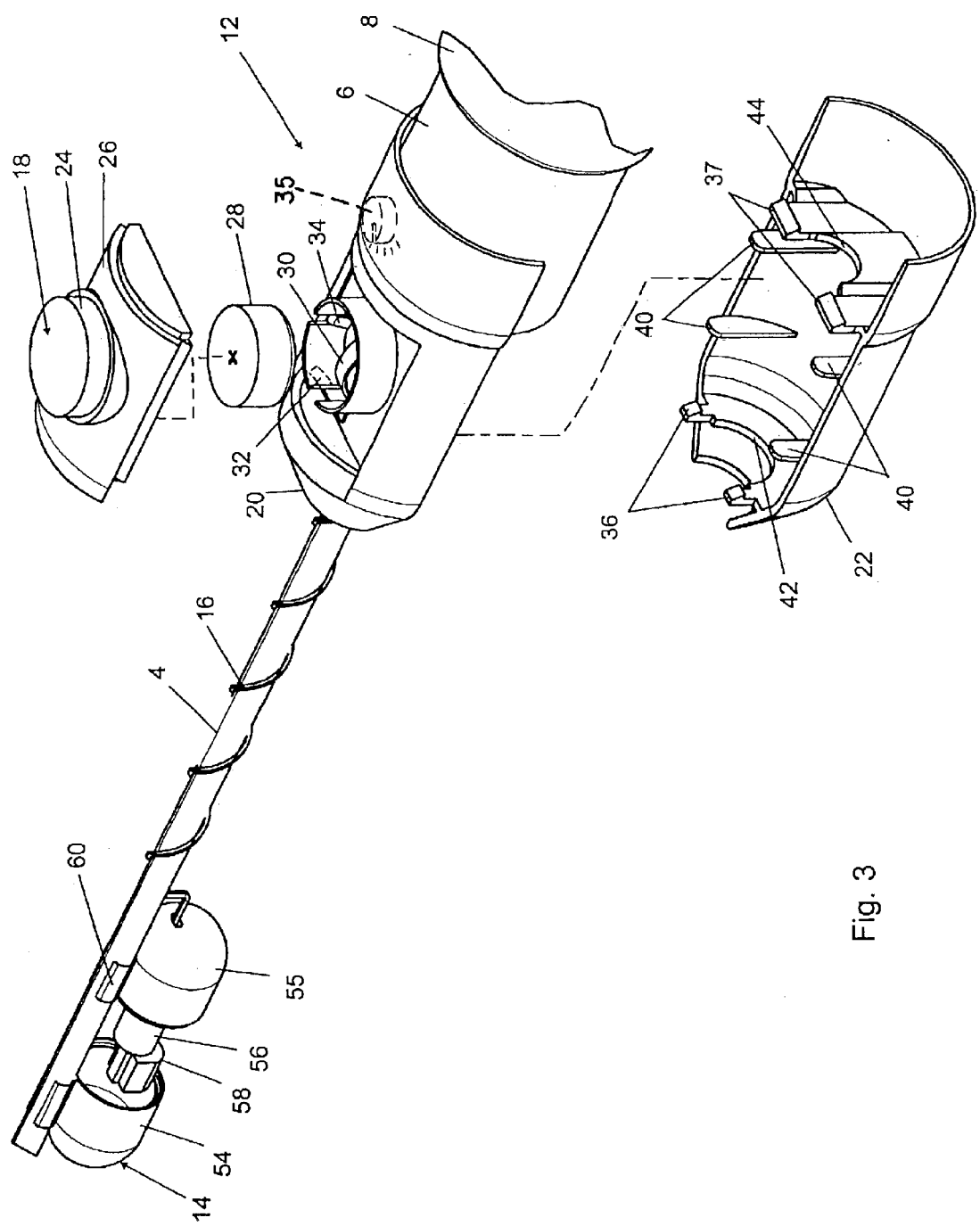
FIG. 3 is a perspective drawing shown from the top in exploded assembly to the ferrule switch and vibrator motor of the fishing rod of FIG. 1.
Figure 4:
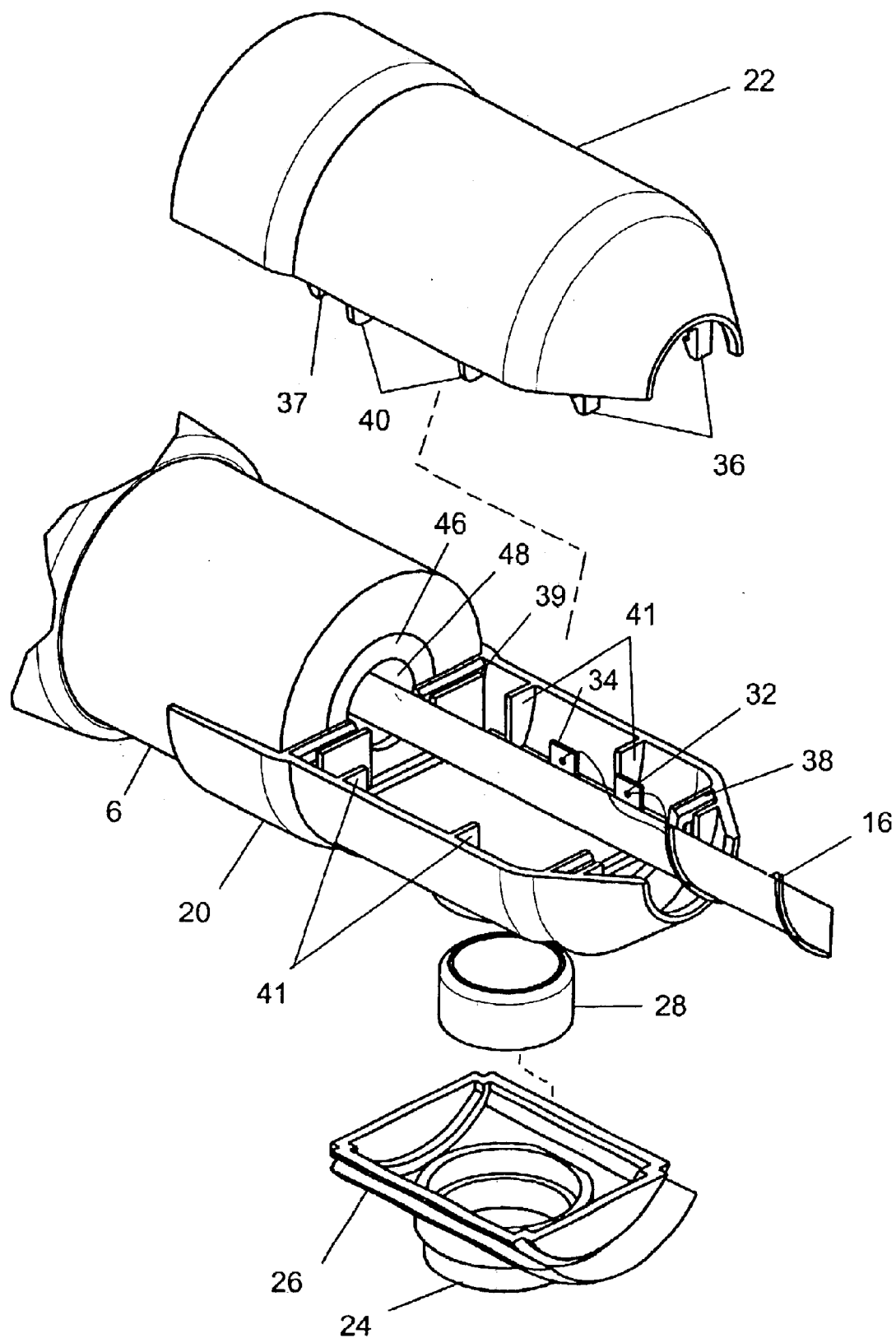
FIG. 4 is a perspective drawing shown from the bottom in exploded assembly to the ferrule switch of the fishing rod of FIG. 1.

With attention to FIGS. 2 through 4, details are apparent to the construction and operation of the ferrule switch 12 and vibrator 14. The switch 12 includes upper and lower cover pieces 20 and 22 that snap together over the fore end of the handle 6. The pushbutton 18 is constructed of an exposed rubber piece 24 that is fitted to a cap 26. The negative terminal of a DC watch-type battery 28 is supported by the rubber piece 24 in contact with a resilient, arcuately bent portion 30 of a positive contact terminal 32. The bent terminal portion 30 elevates the battery 28 above a negative contact terminal 34 and resiliently biases movement of the battery 28.

The conductors 16 connect the contact terminals 32 and 34 to the vibrator 14. Depression of the rubber piece 24 depresses the battery 28 until the sidewall of the positive "+" battery terminal contacts the terminal 34 which causes current to flow to the vibrator 14 so long as contact is maintained. A switch action is thus obtained with minimal parts that might be affected by a cold and/or moist marine environment. It is to be appreciated that relays and/or timing circuits (e.g. multi-position switches or a potentiometer) can be included at the switch 12 to provide several discrete continuous or intermittent or variable vibrating motions and/or initiate other electronic functions.

FIG. 3 depicts a potentiometer based timer controller 35 that might be included at the switch 12. The type of control coupled to the switch 12 can be varied to accommodate the associated timer and/or frequency control circuitry mounted between the covers 20 and 22 to establish a preferred period and frequency of operation of the motor 56. That is, the circuitry can control the period of operation of the motor and/or the speed of motor rotation. A conventional pushbutton might also be substituted for the present pushbutton 18.

Pronged tangs 36 and 37 at the lower cover 20 project and mate with flanged cavities 38 and 39 in the upper cover 22. Gussets 40 and 41 project from the lower and upper covers 20 and 22 to maintain the proper alignment of the cover pieces 20 and 22. Recessed channels 42 and 44 are defined to assure that the covers 20 and 22 do not contact the rod blank 4.

With attention to FIG. 2 and also FIG. 4, the rod blank 4 is concentrically displaced at the handle 6 from a core piece 46. That is, a space 48 is provided that extends substantially the entire length of the handle 6. Similarly, the rod blank 4 is displaced from the ferrule switch 12. A suitable material is mounted over the core piece 46, such as cork or foam sleeve 50 that is gripped by the fisherman. The rod blank 4 is secured with a suitable filler piece 52 that is concentrically mounted in the space 48 and bound with an epoxy to the core piece 46 over approximately the last 25% of the handle 6.

The blank 4 is thus free to oscillate in the gap or core space 48 that is provided in the handle 6. An enhanced lever arm is thus obtained between the motorized vibrator 14 and the anchoring filler piece 52 that is not available with conventional fishing rods, and wherein the handles are anchored over there entire length, particularly at the fore and aft ends, to the rod blank 4.

The vibrator 14 is shown in exploded assembly at FIG. 3. The vibrator 14 consists of housing sections 54 and 55 that surround a motor 56 and an eccentric weight 58 secured to the drive shaft of the motor 56. An open sided channel piece or "C"-shaped clip 60 secures the vibrator 14 to the rod blank 4. Rotation of the eccentric weight 58 induces oscillations in the rod blank 4, which oscillations are exaggerated by the relatively long lever arm due to the unsupported mounting of the rod blank 4 inside the handle 6. That is, the additional length of unsupported rod blank 4 between the vibrator 14 and filler piece 52 produces movements of a supported bait or lure of ⅛ to ½-inch depending upon the length of the rod blank 4. Without the increased lever arm length in the handle 6, such as merely mounting the motor 56 to a conventional rod blank 4 that is rigidly secured over the full length of a handle 6, the oscillations would be relatively tight and not cause a supported bait to discernibly move to and fro.

Figure 6:
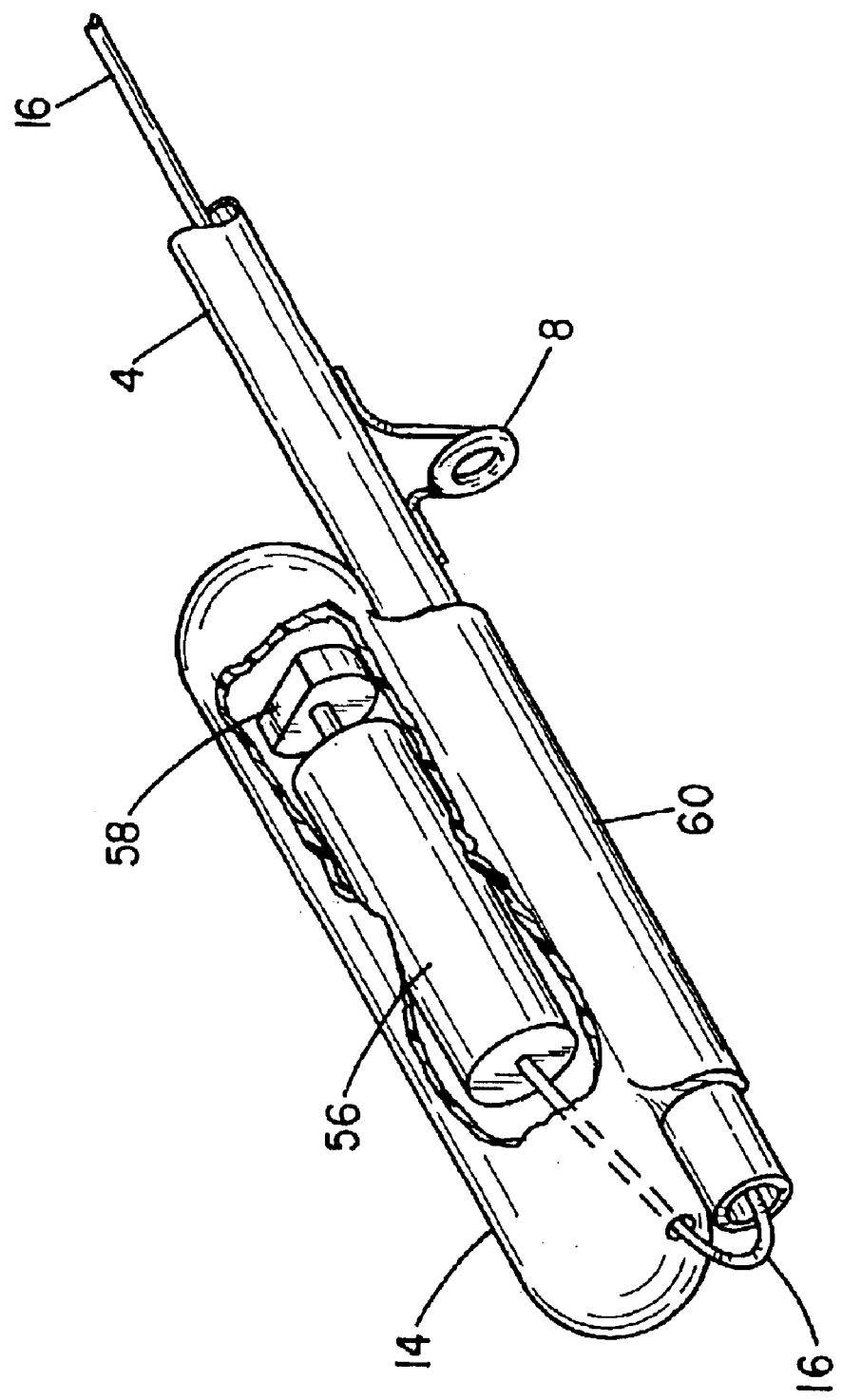
FIG. 6 is a detailed perspective drawing to the tip of a fishing rod and the fitting of the conductor to the motorized vibrator forward of the end tip.

FIGS. 5 and 6 depict alternative mountings of a motorized vibrator 14 to the tip or fore-end of a typical open water fishing rod 3. The vibrator 14 is shown secured to the rod blank 4 aft and slightly forward of the forward most line guide 8. In lieu of providing a conductor 16 that extends along the relatively long exterior surface of the blank 4, the conductor 16 extends beneath the handle 6 and through the bore of the hollow rod blank 4. In particular, the conductor 16 extends along the space 48 and through a channel 64 formed at the filler piece 52. The conductor 16 is then routed into the bore of the blank 4 and out the tip of the blank 4. The integrity of the blank 4 is thereby not compromised such as by boreholes to accommodate conductor routing, which can be especially problematic if let into the tip section as alternatively shown at the rod tip in FIG. 5. A butt cap 66 is typically fitted to cover the end of the handle 6.

While the invention has been described with respect to presently preferred combinational assemblies and considered improvements or alternatives thereto, still other assemblies and arrangements may be suggested to those skilled in the art. It is also to be appreciated that the foregoing vibrator and ferrule switch can be used singularly or can be arranged in different combinations with any type of fresh water and salt water spin casting, bait casting rods and even fly casting rods to provide a variety of improved rods. The vibrator 14 may also be mounted within the bore of relatively large diameter saltwater rod blanks. The battery may also be secured to the rod without acting as a switch contact. The foregoing description should therefore be construed to include all those embodiments within the spirit and scope of the following claims.

What is claimed is:

1. A fishing rod assembly comprising:
    a) a handle including means for supporting a fishing reel containing a length of fishing line;
    b) a rod blank having a plurality of fishing line guides and a hollow bore, wherein said blank is mounted to extend from said handle and wherein a conductor is trained through said bore;
    c) a switch and a battery power source; and
    d) a motor having a weight eccentrically mounted to a shaft and wherein said motor is fastened to said rod blank and coupled to said battery power source via said switch and said conductor, whereby said motor vibrates said rod blank.

2. A fishing rod assembly as set forth in claim 1 wherein said battery power source is mounted between a pushbutton and a first conductor formed to resiliently bias said battery to an off condition and flex with the depression of said pushbutton to an on condition where said battery electrically contacts a second conductor.

3. A fishing rod assembly as set forth in claim 1 wherein said motor is mounted substantially adjacent a tip of said rod blank from which a fishing line depends.

4. A fishing rod assembly as set forth in claim 1 wherein said handle comprises a cylindrical core piece and a cover concentrically mounted relative to one another.

5. A fishing rod assembly as set forth in claim 4 wherein said conductor is trained beneath said cover and through said bore of said rod blank.

6. A fishing rod assembly as set forth in claim 1 wherein said motor is mounted substantially adjacent a tip of said rod blank from which a fishing line depends.

7. A fishing rod assembly as set forth in claim 1 wherein said handle comprises a cylindrical filler piece, a cylindrical core piece and a cylindrical cover concentrically mounted relative to one another over.

8. A fishing rod assembly as set forth in claim 1 including means exclusive of said switch for selectively controlling a period of operation of said motor.

9. A fishing rod assembly as set forth in claim 1 including means exclusive of said switch for selectively controlling a speed of rotation of said motor.

10. A fishing rod assembly comprising:
    a) a handle including means for supporting a reel containing a length of fishing line;
    b) a rod blank mounted to said handle and at least one line guide;
    c) a switch wherein a battery power source is mounted between a pushbutton and a first conductor, wherein said first conductor is formed to resiliently bias said battery power source to an off condition and flex with the depression of said pushbutton to an on condition where said battery power source electrically contacts a second conductor; and
    d) a motor responsively coupled to said first and second conductors and having a weight eccentrically mounted to a shaft and wherein said motor is fastened to said rod blank, whereby said motor vibrates said rod blank.

11. A fishing rod assembly comprising:
    a) a handle comprising, a filler piece and a core piece having a hollow bore and a reel containing a length of fishing line;
    b) a rod blank mounted to said handle and supporting a plurality of fishing line guides, wherein said rod blank is mounted to extend in unsupported relation in said bore over a substantial length of said handle and wherein said filler piece abuts and supports said rod blank to said handle;
    c) a switch and a battery power source mounted to said handle; and
    d) a motor responsively coupled to said switch and having a weight eccentrically mounted to a shaft and wherein said motor is fastened to said rod blank, whereby said motor vibrates said rod blank and the fishing line supported thereto.

12. A fishing rod assembly as set forth in claim 11 wherein said battery power source is mounted between a pushbutton and a first conductor formed to resiliently bias said battery power source to an off condition and flex with the depression of said pushbutton to an on condition where said battery power source electrically contacts a second conductor.

13. A fishing rod assembly as set forth in claim 11 wherein said switch is mounted to said handle and has first and second mating covers and wherein said battery power source is mounted between a pushbutton and a first conductor mounted to at least one of said first and second covers, wherein said first conductor is formed to resiliently bias said battery power source to an off condition and flex with the depression of said pushbutton to an on condition where said battery power source electrically contacts a second conductor.

14. A fishing rod assembly as set forth in claim 13 wherein said handle includes reel seat means for securing said a reel to said handle and wherein said switch is mounted to said handle forward of said reel seat means.

15. A fishing rod assembly as set forth in claim 11 wherein said motor is mounted to a housing that includes an open-sided channel piece that fastens to said rod blank.

16. A fishing rod assembly as set forth in claim 11 including means exclusive of said switch for selectively controlling a period of operation of said motor.

17. A fishing rod assembly as set forth in claim 11 including means exclusive of said switch for selectively controlling a speed of rotation of said motor.

18. A fishing rod assembly comprising:

a) a handle and a fishing reel containing a length of fishing line;

b) a rod blank having a plurality of fishing line guides and mounted to extend from said handle and wherein said rod blank includes a hollow bore and a conductor trained through said bore;

c) a switch and a battery power source; and d) a motor mounted substantially adjacent a tip of said rod blank from which said fishing line depends and having a weight eccentrically mounted to a shaft and wherein said motor is fastened to said rod blank and responsively coupled to said switch, said conductor and said battery power source, whereby said motor vibrates said rod blank and depending fishing line.

19. A fishing rod assembly comprising:

a) a handle and a reel mounted thereto containing a spooled length of fishing line;

b) a rod blank supporting a plurality of line guides and wherein said rod blank is concentrically mounted to extend in substantial unsupported relation in a hollow bore of said handle;

c) a switch mounted to said handle having first and second mating covers and wherein a battery power source is mounted between a pushbutton and a first conductor, wherein said first conductor is formed to resiliently bias said battery power source to an off condition and flex with the depression of said pushbutton to an on condition where said battery power source electrically contacts a second conductor; and d) a motor responsively coupled to said first and second conductors and having a weight eccentrically mounted to a shaft and wherein said motor is fastened to said rod blank, whereby said motor vibrates said rod blank and said fishing line.

20. A fishing rod assembly as set forth in claim 19 including a conductor trained through said bore of said rod blank, whereby the motor is coupled to said battery power source via said switch and said third conductor.

* * * * *